United States Patent Office 3,236,374
Patented Feb. 22, 1966

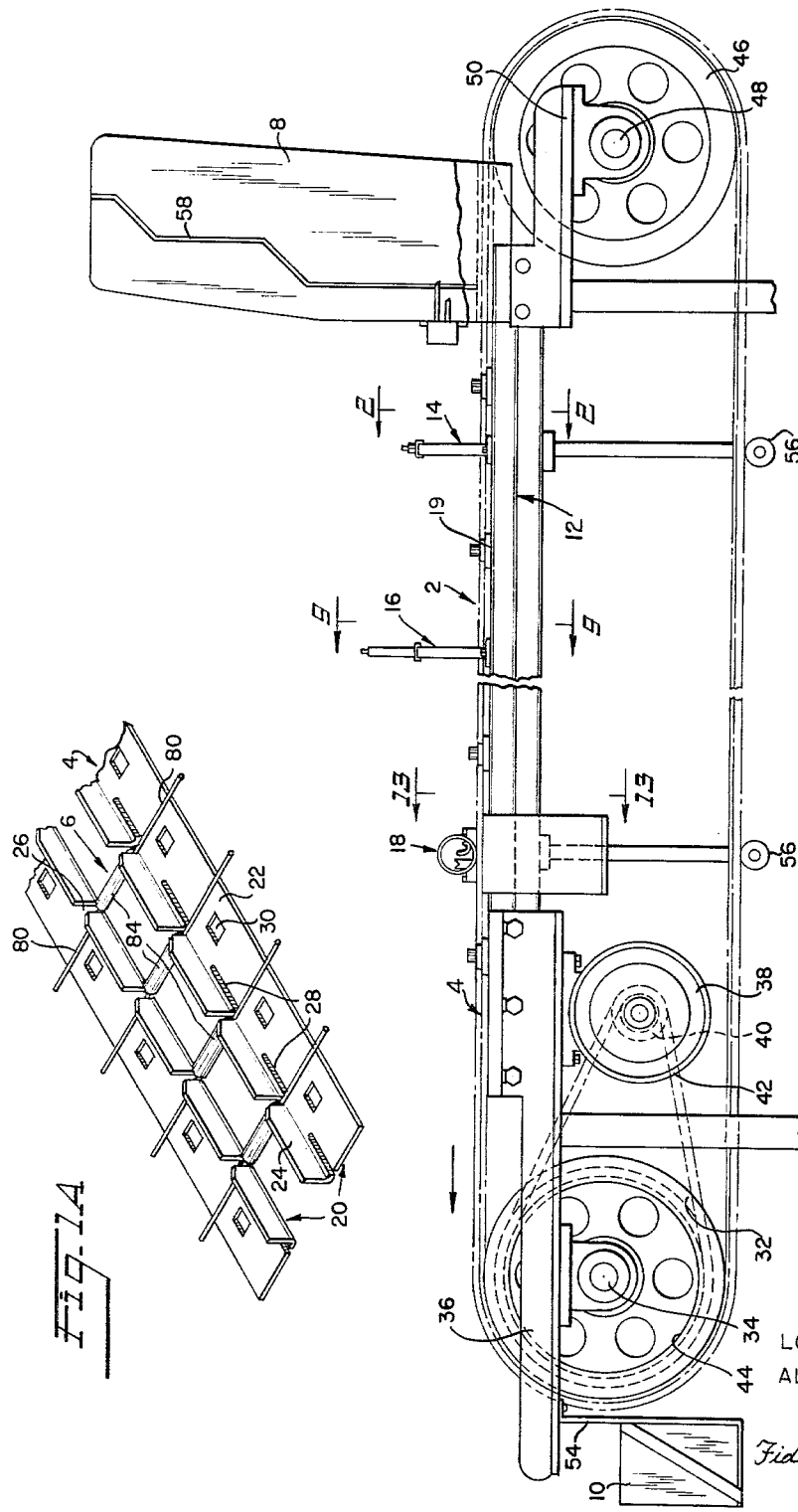

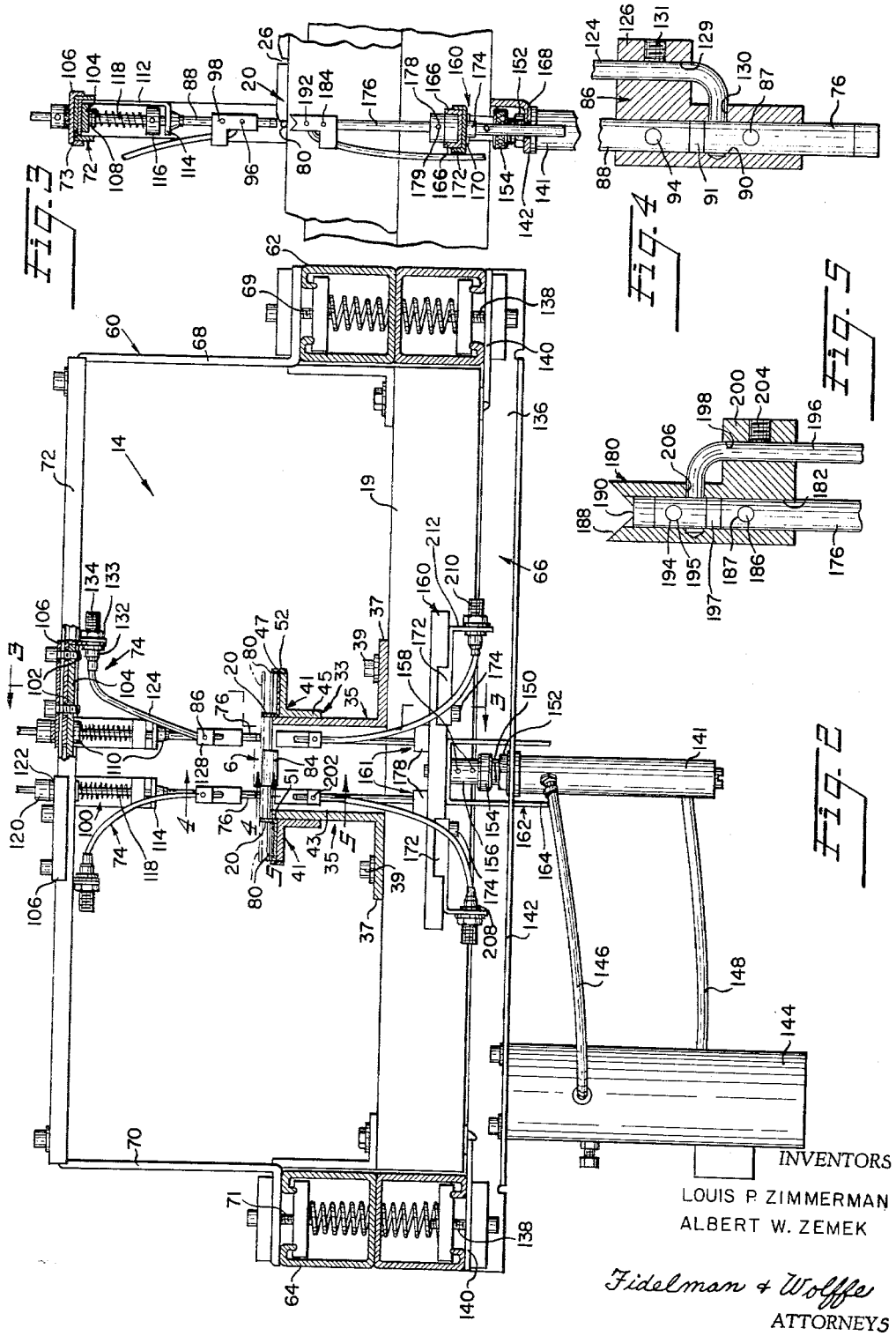

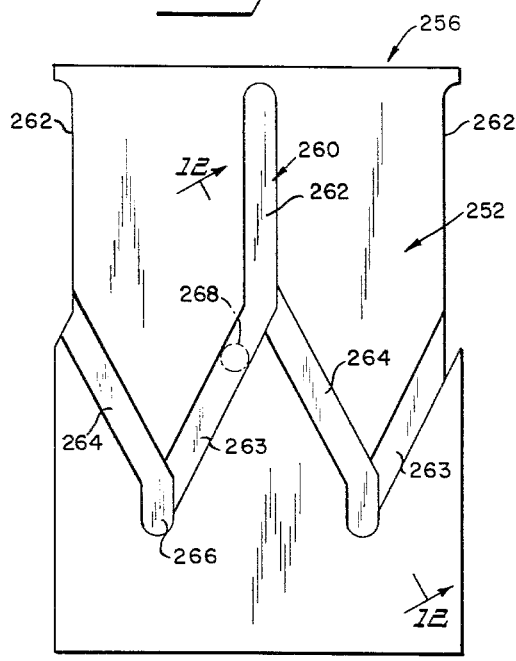

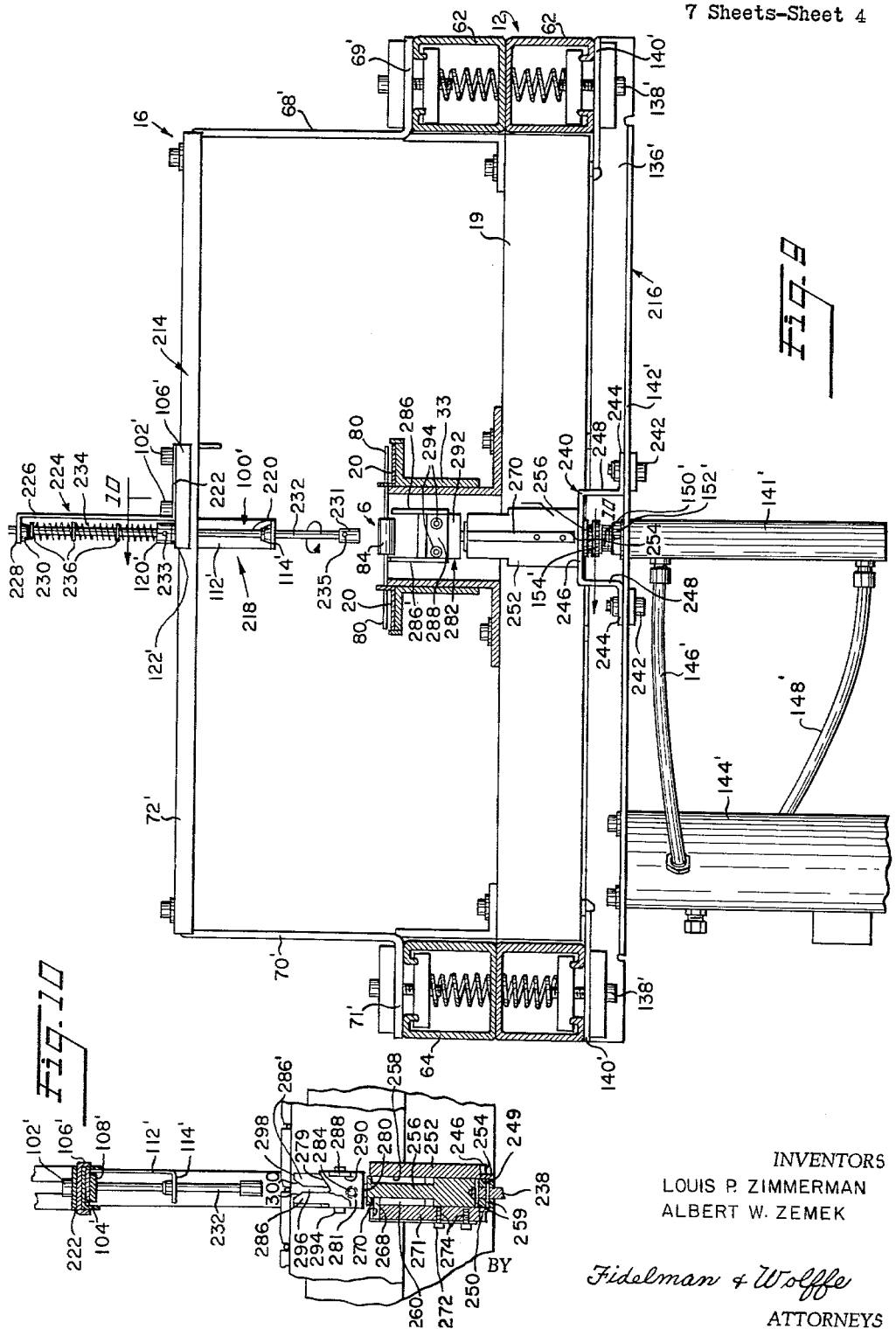

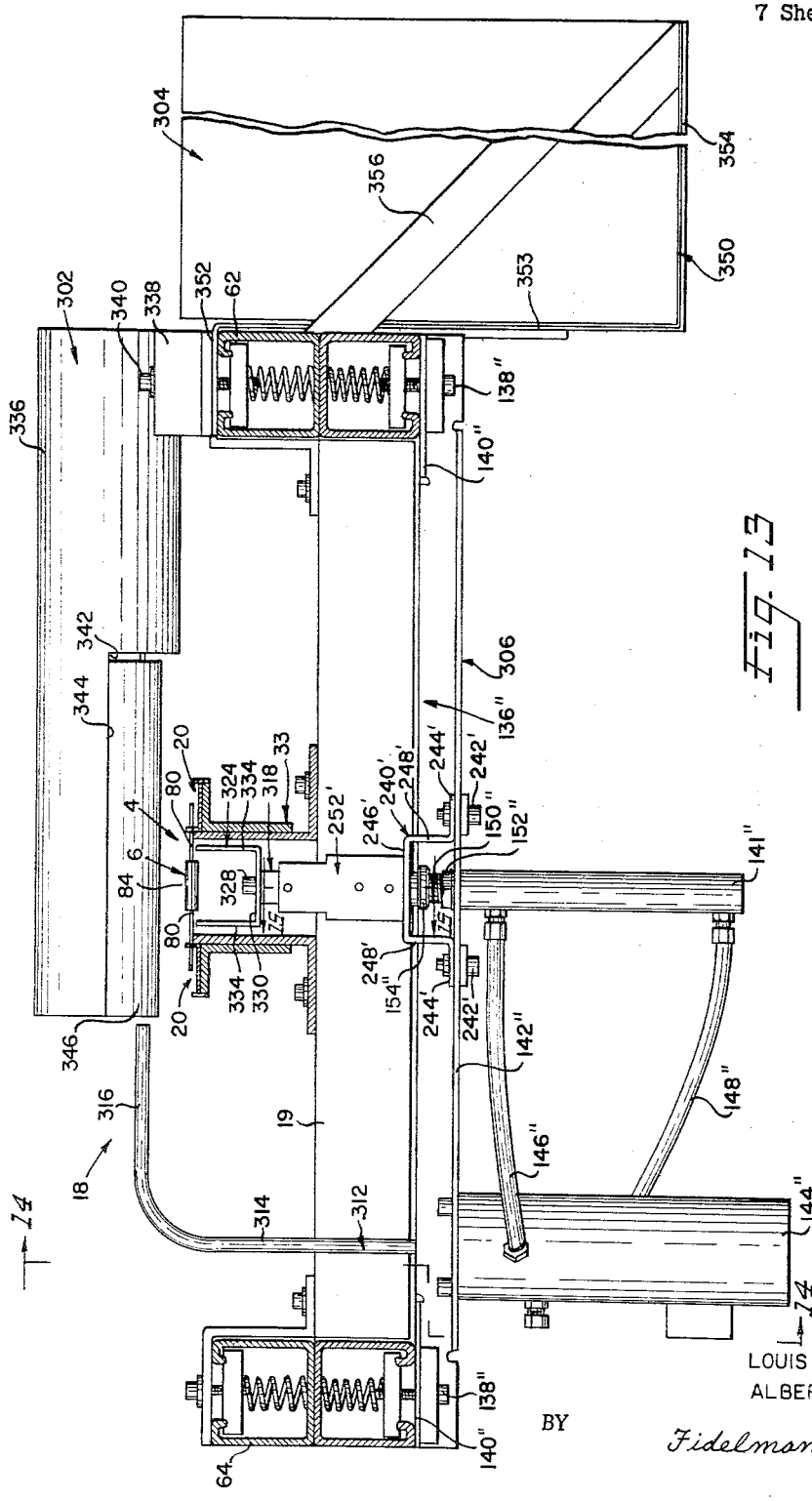

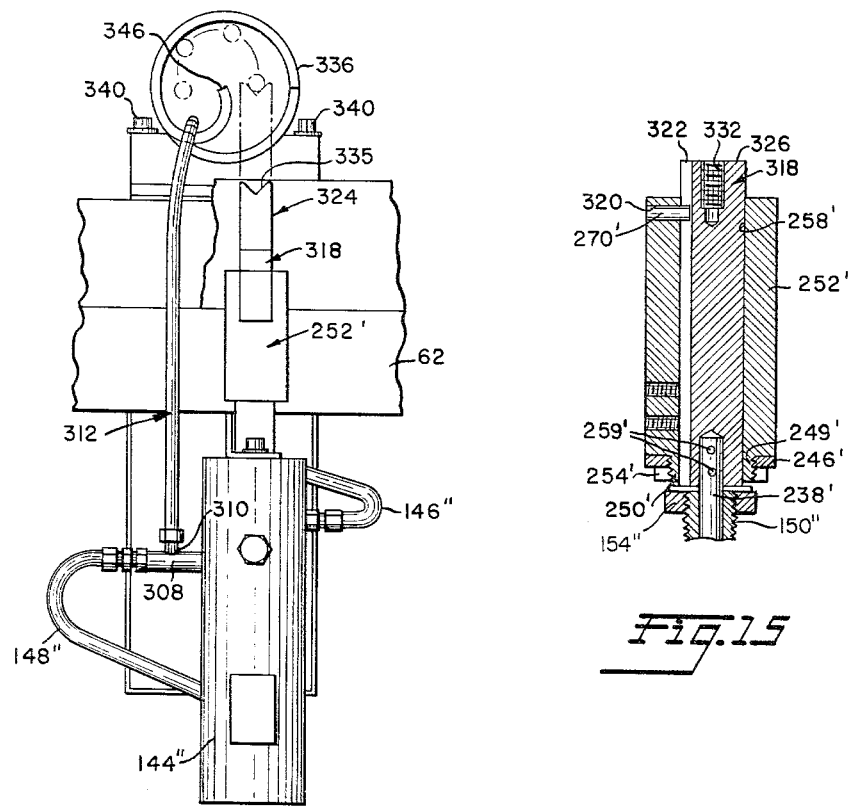
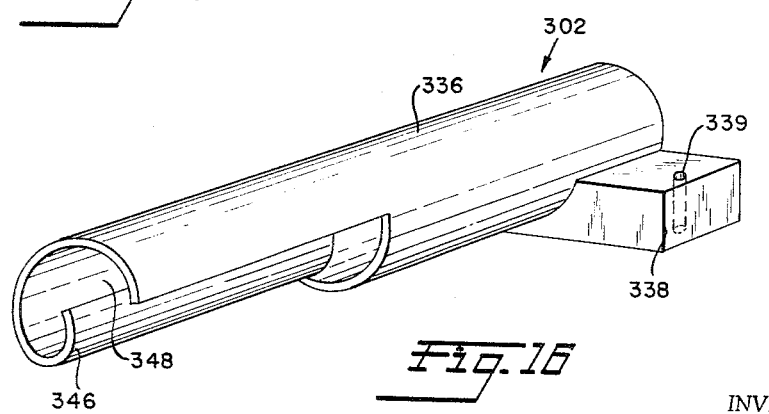

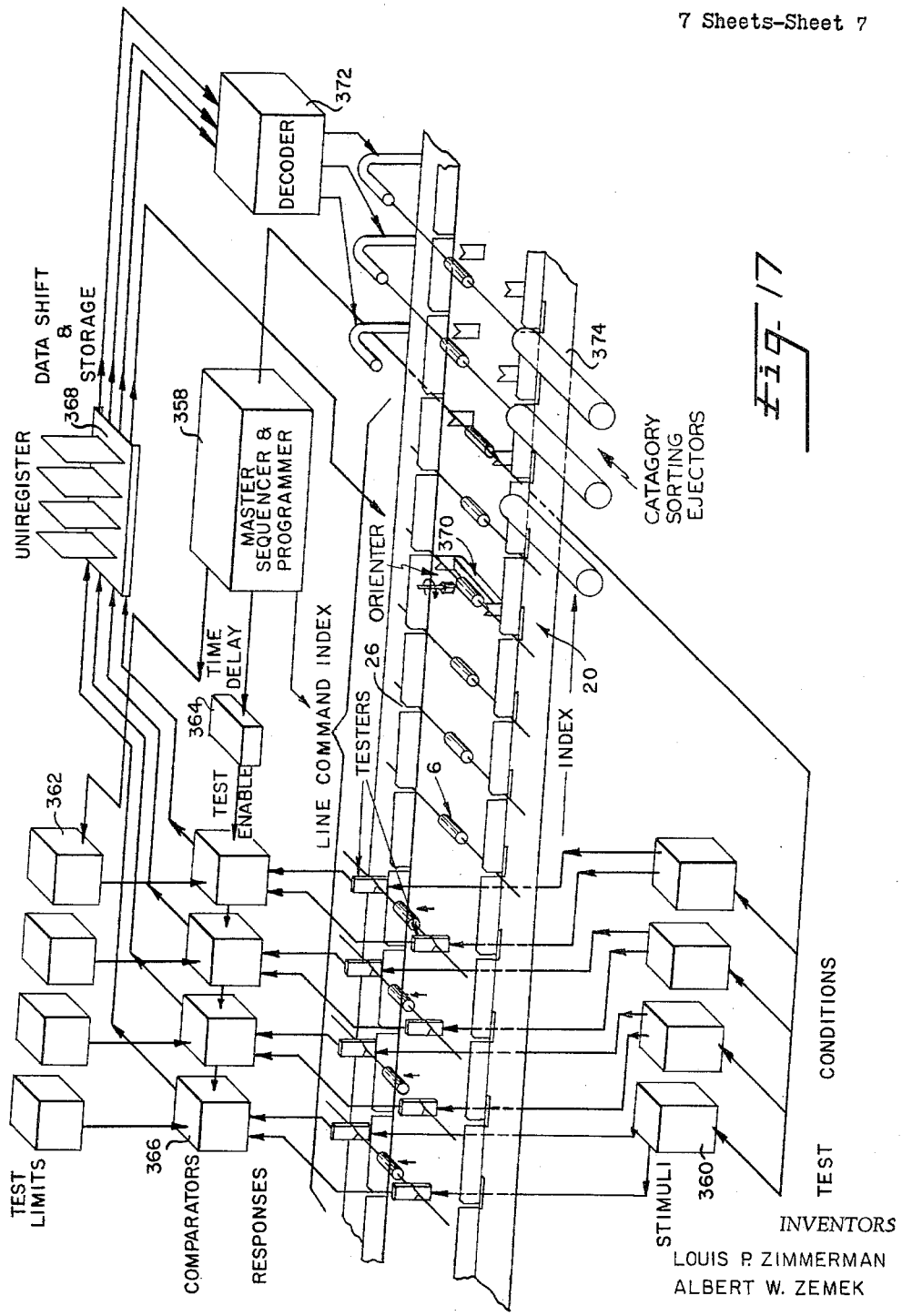

3,236,374
LINE TESTING AND HANDLING APPARATUS
Louis P. Zimmerman and Albert W. Zemek, Binghamton, N.Y., assignors to Universal Instruments Corporation, Binghamton, N.Y., a corporation of New York
Filed Feb. 10, 1964, Ser. No. 343,875
29 Claims. (Cl. 209—75)

This invention relates to means for in-line testing, orienting and rejecting electrical components. More specifically, this invention relates to the design of modular testing, orienting, and rejecting stations that may be mounted on a conveyor in preparing components for taping or packaging operations and adaptable for testing, rejecting and orienting axial lead components in any number or order of separate operations, as desired.

In the electronics industry there has always been a great demand for inexpensive and highly flexible testing devices for such items as axial lead components. In today's highly competitive markets, the manufacturer must be able to produce resistors, capacitors and other components in a multitude of sizes and specifications as well as within many different tolerance ranges depending upon the requirements. With the testing machines in use today, the particular tests available in any one machine are severely limited by design, most devices allowing for one testing station and one ejecting station. If the particular component requires several different tests, it follows that extra test machines must be pressed into service or a new machine obtained that is designed for the particular operation. Conversely, if a multi-test machine is used on components utilizing only one test station, a large portion of the machine's potential is wasted. Furthermore, once a particular machine has been set up to perform a particular test procedure, it is not easy to re-set for entirely different requirements.

Another rather complicated problem in this field is that of component orientation. Most of the prior art devices use some sort of alternate guide way means through which the component must travel while it is rotated 180° and before it again reaches the main channel. This type of device is large and cumbersome and must be built into the testing machine at high cost, although it is not used during many of the runs in which directional orientation of components is not required.

It is, therefore, an object of the present invention to provide for inexpensive and versatile devices for testing electronic components.

Another object of the invention is to provide removable modular testing, orienting and ejecting stations for use with a conveyor line so that a required testing procedure can be set up in a minimum of time and with a minimum of expense.

A further object of the invention is to provide an extremely simple and inexpensive basic unit which can be modified to perform the functions of a component tester, orienter, or ejector adaptable for a great many size components whereby short runs of a particular design of axial lead component is economically feasible.

It is a still further object of the invention to provide pneumatically operated modular stations which may be installed at any point along a conveyor line for ease of operation.

Other objects and the nature and advantages of the present invention will be apparent from the following description taken in conjunction with the accompanying drawings, wherein:

FIG. 1 is a side view of a portion of an electronic component in-line testing and handling machine including modular testing, orienting and ejecting stations of the instant invention mounted on a conveyor line used for transporting axial lead components from a wire straightening machine to a collection bin;

FIG. 1A is a perspective view of a double endless belt conveyor of the in-line testing and handling machine, illustrated in FIG. 1;

FIG. 2 is a sectional view, taken through lines 2—2 of FIG. 1, illustrating a front plan view of the modular test station mounted on the conveyor for testing electronic components;

FIG. 3 is a sectional view of the modular test station taken along section lines 3—3 of FIG. 2;

FIG. 4 is a sectional view of one of the upper electrical contacts of the modular test station as taken along lines 4—4 of FIG. 2;

FIG. 5 is a sectional view of one of the lower electrical contacts and lifting fingers of the modular test station as taken along lines 5—5 of FIG. 2;

FIG. 6 is a bottom plan view of an elongated platform designed to adjustably carry the lower contacts of the tester and illustrated in the complete testing device shown in FIGS. 2 and 3;

FIG. 7 is a bottom plan view of a spanning member designed to carry the upper contact assemblies of the tester illustrated in FIGS. 2 and 3;

FIG. 8 is a side view of the main mounting bracket for the upper contacts, shown in FIGS. 2 and 3 in conjunction with a slidable rod;

FIG. 9 is a sectional view, taken along lines 9—9 of FIG. 1 illustrating the front view of the modular orienter in conjunction with the conveyor line for re-orienting components which have been tested and indicate incorrect polarity at the test station;

FIG. 10 is a sectional view of the component lifting fingers and their reciprocating and rotating means taken along lines 10—10 of FIG. 9;

FIG. 11 is an unfolded view of the surface of the cylindrical cam shown in FIG. 10 illustrating the configuration of the cam slots;

FIG. 12 is a side view taken along lines 12—12 of FIG. 11 and illustrating in detail the comparative depths of portions of the slots resulting in the cam being rotated in one direction only;

FIG. 13 is a sectional view, taken through lines 13—13 of FIG. 1 illustrating a front view of the modular ejecting means mounted on the conveyor line and controlled by the test station for selective rejection of components not meeting the test requirements;

FIG. 14 is a sectional view taken along lines 14—14 of FIG. 13 illustrating the relation of the blow tube to the ejector chute in the modular ejecting station;

FIG. 15 is a sectional view taken along lines 15—15 of FIG. 13 illustrating the relation of the reciprocatable ejection fingers to the ejector tube;

FIG. 16 is a perspective view of the ejection tube used in conjunction with the modular ejector for removing a component from the conveyor line and placing it in a rejection bin; and FIG. 17 is a schematic line diagram of a testing, orienting and sorting system using the modular units of the instant invention.

Referring particularly to FIGS. 1 and 1a, an in-line testing and handling machine generally designated 2, comprises a conveyor generally designated 4 for transferring axial lead electronic components, generally designated 6, from a chute 8 (which may be the terminus of a lead straightener, bowl feed, or other component handling device) fixed on one end of the conveyor 4, to a collection bin 10 fixed at the other end. Mounted on the conveyor bed, generally designated 12, and straddling the conveyor 4 are a modular component tester generally designated 14, a modular component orienter generally designated 16, and a modular component ejector generally designated 18.

The conveyor 4, is composed of a pair of metallic one-piece endless bands generally designated 20, each having an L shaped cross section, composed of a belt portion 22 and a perpendicular flange portion 24, with article carrying slots 26 formed therein, each slot 26 having an interconnecting stress relief slot 28 in the belt portions. Also formed in the belt portions, between each stress relief slot 26, is a gear meshing slot 30. The particular configuration of the belts 20, article carrying slots 26, and stress relief slots 28, are not a part of this invention and are being disclosed for illustrative purposes only. The various belt designs are fully shown in our copending application Serial No. 215,407, filed August 7, 1962, now Patent No. 3,138,239.

The conveyor runs 20 are slidably mounted in a pair of parallel channel members, generally designated 33 (FIG. 2) bolted to the upper faces of cross members 19, spanning the longitudinal conveyor frame members 62 and 64 to comprise therewith the conveyor bed 12. Each conveyor channel member 33 is composed of a lower, longitudinally oriented angle iron generally designated 35 extending the length of the conveyor bed 12 and bolted by a horizontal leg 37 to the cross members 19 by bolts 39, and an upper, inverted angle iron 41 welded to the lower angle iron 35 so that the vertical legs 43 and 45, respectively, are in face to face relationship, and the upper extending horizontal leg 47 of the each of the angle irons 41 extends over and parallel to the lower horizontal leg 37 of the abutting angle iron 35. The upper angle irons 41 are fixed to the lower angle irons 35 so as to leave a short portion of the vertical leg 43 of the lower angle iron 35 extending above the horizontal leg 47 of the upper angle iron 41 to form an inner flange 51, while an outer flange 52 is welded to the extreme end of the horizontal leg 47 of the upper angle iron 41. The flanges 51 and 52 forming a guide for each conveyor belt 20. The two opposing conveyor channels 33 thus formed are arranged with the upper and lower horizontal legs 47 and 37 respectively extending outwardly of each other forming an unobstructed space therebetween. The conveyor belts 20 are each mounted in the guide channel between the flanges 51 and 52 with the horizontal belt portions 22 extending outwardly of each other.

A pair of parallel conveyor bed extensions 36 (FIG. 1) are mounted on either side of one end of the conveyor bed 12 for journalling a drive gear shaft 34 therebetween. A pair of drive gears 44 are fixed to the rotary drive gear shaft 34 in the vertical planes of the center lines of the conveyor belt guide channels 35. The drive gear shaft 34 is rotated by the electric motor 38 bolted across the bottom of the extension 36, adjacent the drive gear shaft 34 and is drivingly connected thereto by an endless belt 42 entrained over a pulley 40, affixed to the armature shaft of the electric motor 38, and the pully sheave 32, fixed to the drive shaft 34. Also mounted on the conveyor bed extensions 36 and outwardly of the drive gears 44, is a framework 54 adapted to removably hold the component collection bin 10 for receiving the electrical components 6 as they drop off the conveyor 4 at the far end thereof.

At the other end of the conveyor bed 12, a pair of parallel bed extensions 50 rotatably journal a pair of idler gears 46 mounted on an idler gear shaft 48 and in the same vertical planes as the drive gears 44. The gear meshing slots 30 of each belt portion 22 also mesh with the peripheral teeth on the respective idler gear 46. A pair of guide rollers 56 supports the lower flights of the endless conveyor 4 extending between the drive gears 44 and the idler gears 46 while the upper flights is supported in the guide channels 35. The pair of parallel conveyor bands 20 are each driven by one of the driving gears 32 the peripheral teeth of which mesh with the gear meshing slots 30 in the associated belt portions 22 to drive the two belts simultaneously. The article carrying slots 26, in the vertical flanges 24 of the opposing belts, are arranged to allow the leads 80 of the components 6 to lie perpendicular to the flanges 24.

As a component 6 drops out of the guide slots 58 in the chute 8, it will be picked up by a pair of article carrying slots 26 in the bands 20 of the conveyor and carried past the component tester 14, the component orienter 16, and the component ejector 18. All the components remaining on the conveyor after passing the ejector 18 will fall from the conveyor 4 and be collected in the bin 10 for further processing.

*The modular component tester*

Referring particularly to FIGS. 2 and 8, the component tester 14 is composed of an upper tester section, generally designated 60, spanning the conveyor bed 12 and adjustably mounted on the upper faces of the side rails 62 and 64 between a pair of transverse conveyor bed supports 19, and a lower tester section, generally designated 66, is mounted on the lower faces of the side rails 62 and 64, in the same vertical plane as the upper section 60 of the component tester 14. The upper section 60 has a pair of vertical mounting legs 68 and 70 with the feet 69 and 71 thereof bolted to the upper faces of the rails 62 and 64 respectively. A tester upper spanning member 72, U shaped in cross section and parallel to the top face of the conveyor bed 12, is fixed to horizontal upper end flanges of the legs 68 and 70 and spans the area between the side rails 62 and 64 of the conveyor bed 12. A transverse, centrally located, slot 75 (FIG. 7) extends half the length of the base 73 of the U shaped spanning member 72 with a pair of identical upper contact assemblies, generally designated 74, mounted in the slot on the base section 73 between the legs 77 of the U and equidistant from the center of the spanning center section 72. Each upper contact assembly 74 has a spring biased electrical contact 76 lying above an axial lead 80 of the component 6 and on either side of the component body section 84 as it is carried under the upper contact assemblies 74 by the conveyor 4. Each of the electrical contacts 76 is held in one end of a central channel 90 (FIG. 4) of an insulating contact holder generally designated 86 and extends downwardly therefrom, fastened in the channel 90 by a roll pin 87 pressed into an intersecting passage 96 in the contact holder 86 through a coaxial hole in the electrical contact 76. A holder mounting circular rod 88 is vertically slidably mounted in each of the assemblies 74 with its lower end extending into the upper portion of the central channel 90 of one of the contact holder 86 and held therein by a roll pin 94 pressed into an intersecting passage 98 in the contact holder 86 and through a coaxial passage in the reciprocating rod 88. An electrically insulating washer 91 is inserted between the upper end of the electrical contacts 76 and the lower end of the mounting shaft 88.

Each upper contact assembly 74 has a main bracket 100 (FIGURES 2, 3 and 8) fastened to the under side of the base 73 of the spanning member 72 by two bolts 102, extending down through a pair of transversely arranged holes in a "U" shaped washer element 106 nesting over the top of the spanning member 72, through the transverse slot in the base 73 of the spanning member 72, through a pair of coaxially aligned holes in a horizontal mounting portion 104 of the main bracket 100, and threaded into a pair of coaxially aligned holes in a washer plate 108, beneath the mounting portion 104 of the bracket 100. At the inner end of the mounting portion 104 (FIG. 8) of each main bracket 100 is a third hole, coaxial with a third hole in the washer member 106 and also in alignment with the transverse slot in the base 73 of the spanning member. Pressed into the third hole in each of the mounting sections 104 is a rod bearing 110 having a circular hole with a flattened portion (not shown) extending the length thereof for receiving the reciprocating rod 88 which has a corresponding flattened side (not shown) preventing relative rotation of these two elements. A vertical extension 112 of each bracket 100 has a horizontal flange 114 carrying a second pressed in rod bearing 110 having an aligned hole for guiding the lower end of the reciprocating rod 88. An abutment 116 is fixed to each rod 88 between the pair of bearings 110 to compress a coil spring 118 encircling the rod 88 between the abutment 116 on the rod 88 and the upper bearing 110 on the main bracket 100. The upper end of each reciprocating rod 88, extending above the spanning member 72, has a limit stop 120 adjustably fixed thereon with a rubber buffer washer 122 mounted on the rod 88 between the "U" shaped washer 104 and the limit stop 120 whereby the spring 118 holds the contact 76 extended resiliently in its lowermost position as controlled by the adjustable limit stop 120.

An insulation covered electrical wire 124 is fixed in a passage 129 through a boss 126 on each of the contact holders 86 by a set screw 128 threaded into an intersecting hole 131 in the boss 126 and abutting the wire 124. The wire 124 extends from the opposite side of the boss 126 into another passage 130 in the body of the contact holder 86, intersecting the central channel 90 in the main body of the contact holder 86 where it is force fitted into one of the electrical contacts 76 residing therein. The other end of the insulated wire 124 has a male electrical jack 132 fitting into a mating female connector 134 mounted in a second vertical extension 133 which extends downward from the outer end of the bracket mounting section 104 of the contact assembly mounting bracket 100.

The lower test section 66 has a central spanning member 136 mounted on the lower faces of the side rails 62 and 64 of the conveyor bed 12 by bolts 138 extending through an upper horizontal flange 140 at each end. A lower horizontal flange 142 on the spanning member 136 mounts a downwardly extending servo valve 144 for applying pneumatic pressure through lines 146 or 148 to either end of an air cylinder 141 to reciprocate an included piston (not shown). The air cylinder 141, which is centrally mounted in the lower spanning member 136, beneath the center sections 84 of the conveyed components, has a threaded portion 150 of the cylinder 141 extending through a central hole 168 in the lower flange 142 of the spanning member 136 and held in place by a nut 152 threaded on the portion 150 tightly against the lower flange 142. A shock absorbing rubber washer 154 is threaded onto the upper end of the threaded portion 150. A reciprocating shaft (not shown) extends from the upper end of the piston, within the cylinder 141, through the threaded portion 150 and the shock absorbing washer 154. A cylinder boss member 156 is mounted on the upper end of the piston shaft by a pair of roll pins 158 pressed into coaxial holes in the two elements.

An elongated platform 160 (FIGS. 2 and 6) of "U" shaped cross-section is mounted transversely across the conveyor bed 12 on the upper end of the piston shaft, and rests upon the upper face of the cylindrical boss 156, with the piston shaft end extending through a central aperture in platform 160 (not shown) and held in place by a limit stop on the piston rod end on the upper side of the platform 160. Riveted centrally below the platform 160, just above the cylinder boss member 156, is a "U" shaped guide 162 having an aperture 161 concentric with the central aperture in the platform 160 for receiving the piston rod and further having downwardly extending legs 164 fitting into transverse slots 168 in the lower flange of the lower spanning member 136 on either side of the air cylinder 141 to prevent rotation of the platform 160 upon vertical actuation by the cylinder 141. A pair of long, narrow, transverse slots 171 in the base 170 of the platform 160 are equally spaced on either side of the central aperture thereof for mounting a pair of mounting blocks 161 secured on the top of the platform 160 equally spaced from the center aperture, between upturned legs 166 thereof. A pair of "U" shaped washers 172 are nested about the underside of the platform 160 opposite each mounting block 161, each block 161 and washer 172 pair being connected by a bolt 174 extending up through the washer 172, one of the slots in the platform base 170 and being threaded into a coaxial hole in the block 161.

A rod 176 is vertically mounted in a boss 178 at the upper inner end of each mounting block 161 by a set screw 179 and has an insulating contact holder generally designated 180 mounted on the upper end thereof. The upper ends of the rod 176 each extend into a central channel 182 in the contact holder 180 and are held in place by a roll pin 184 pressed into an intersecting passage 186 in the holder 180 and a coaxial hole 187 in the upper end of the rod 176. The upper face of the holder 180, adjacent the central channel 180, has a "V" shaped notch 188 with a contact 190 extending up slightly into the lower portions of the "V" from the central channel 182 and secured therein by roll pin 192 pressed into an intersecting passage 194 and a coaxial hole 195 in the contact 190. An insulating washer 197 is located in the central channel 182 between the upper end of the rod 176 and the lower end of the contact 190. The two contacts 190 lie directly beneath the opposing upper contacts 76, on either side of a conveyed component body 84, with the axial leads 80 interposed therebetween. An insulated wire 196 is mounted in passage 198 through a boss 200 in each contact holder 180 and is secured in place by a set screw 202 threaded into an intersecting passage 204 in the boss 200 and abutting the wire 196. One end of the wire extends through a passage 206 in the main body of the contact holder 180 intersecting the central channel 182 and is force fitted into a passage in the contact 190. The other end of the wire 196 is secured to a male electrical jack 208 which in turn is plugged into a female socket member 210 mounted in a vertical flange 212 extending downward from the outer end of each lower washer 172.

In operation, the tester 14 acts upon each component 6 as the conveyor is repeatedly halted with the horizontal axis of the body 84 of a component 6 lying between the contacts 76 and 190 and in a plane through the vertical axes thereof. An electrical signal actuates the solenoid 144 to apply air pressure to the lower end of the piston in the air cylinder 141 each time the conveyor stops and the pressure developed in the cylinder drives the platform 160 upwardly, picking up the leads 80 of the electrical component 6 in the grooved upper faces of the lower contact holders 180 and raising the component 6 out of contact with the conveyor belts 20 and into abutting relationship with the upper contacts 76 which are biased slightly upward. An electrical test across the component is now possible. Once the tests have been made and the result stored for further reference in a memory device, such as the Universal Uniregister (as disclosed in the copending application of Louis P. Zimmerman, Ser. No. 262,978, filed March 5, 1963, now Patent No. 3,147,637) the solenoid valve 144 is reactivated to release the pressure in the line 148 and apply pressure through line 146 to the upper end of the piston in the air cylinder 141. The platform 160 drops back to the rest position with the contact holder 180 below the conveyor belts 20 and the component 6 again drops into the same pair of opposed article carrying slots 26. The conveyor is then actuated to move the next component in line to a position between the contacts 76 and 190, while the first component 6 moves onward toward the orienting, ejecting sections 16 and 18, respectively.

The component tester is adaptable to a great number of operations. Since it is divided into two sections 60 and 66, it can fit almost any depth conveyor bed with the cylinder 150 extending further into the lower section 66 to make up for greater depth. Also, the spring biased contacts 76 allow for a certain latitude in stroke. The contacts may be spread apart further or moved closer together due to the transverse slots in the upper spanning member 72 and the lower platform 160, to accept components having different size body portions 84. Since the lower contact is mounted in a notched face 188, any diameter lead can be accepted which will ride in the notch 188 and still touch the top of the contact 190. Furthermore, any number of modular test units may be added along the length of the conveyor to perform the required number of special tests.

In the illustrated tester unit four electrical contacts are shown, one above and one below each lead. Depending on test requirements two of the contacts may be disconnected or omitted, leaving one contact for each lead. Testing with such an arrangement may be made by the comparative described in the Wilson et al. Patent 3,073,446 or any other two contact test circuit.

The modular component orienter

Referring to FIGS. 9–12, the component orienter 16 is composed of an upper orienter section, generally designated 214, spanning the conveyor bed 12 and adjustably mounted on the upper faces of the side rails 62 and 64 between a pair of transverse conveyor bed supports 19, and a lower section, generally designated 216 mounted on the lower faces of the side rails 62 and 64, in the same vertical plane as the upper section 214 of the component tester 14. The upper section 214 has a pair of vertical mounting legs 68' and 70' identical to those of the tester unit 14 with feet 69' and 71' thereof bolted to the upper faces of the rails 62 and 64 respectively. An orienter upper spanning section 72', identical with the upper spanning member 72 of the tester unit 14, is mounted parallel to the top face of the conveyor bed 12, and is fixed to the horizontal flanges at the upper ends of the legs 68' and 70' for spanning the area between the side rails 62 and 64 of the conveyor bed 12.

A component clamping assembly, generally designated 218, is secured on the upper spanning member 72' for guiding and downwardly biasing a reciprocating rod 220, of circular cross-section, mounted therein. The clamping assembly 218 has a main mounting bracket 100', similar to that of the bracket 100 of the tester unit 14, which is fastened to the under side of the base of the spanning member 72' by two bolts 102' extending down through pairs of transversely arranged coaxial holes in a horizontal portion 222 of an auxiliary bracket 224, through a U shaped washer element 106' nesting over the top of the spanning member 72', through the transverse slot in the base of the spanning member 72', and through a pair of coaxially aligned holes situated at the center and at one end respectively, of the mounting portion 104' of the main bracket 100' and threaded into a pair of coaxially aligned holes in a washer plate 108' beneath the mounting portion 104'. At the other end of the mounting portion 104', a third hole is situated coaxial with the midpoint of the spanning member 72' and directly above the centers of the component bodies 84 being conveyed beneath. A first rod bearing (not shown) pressed into the third hole in the mounting portion 104' of the main bracket 100' has a coaxial circular guide passage extending therethrough. A vertical extension 112' of the bracket 100' has a horizontal flange 114' carrying a second pressed in rod bearing 220 with a circular guide passage therein coaxial with the guide passage in the first rod bearing.

The auxiliary bracket 224 has a vertical extension 226 with a terminating horizontal flange 228 having another rod bearing 230 press fit into a hole therein with the guide hole in the rod bearing 230 being coaxial with the guide holes in the rod bearings 220 in the mounting portion 104' and in the flange 114'. A clamping rod 232 is reciprocatably and rotatably journalled in the rod bearings 220 and 230 having a limit stop 120' fixed, by set screw 233, thereto between the washer plate 106' and the bearing 230. A circular rubber shock absorbing washer 122' is loosely mounted on the rod 232 between the limit stop 120' and the washer plate 106'. A biasing coil spring 234 encircles the clamping rod 232 and is compressed between the limit stop 120' and the bearing 230, with a series of circular spaces 236 holding the spring from binding on the rod 232 when it is rotated. A hard rubber cylindrical bumper 231 is axially fixed to the lower end of the clamping rod 232 by a roll pin 235 pressed through coaxial holes in the rod 232 and the bumper 231.

The lower section 216 of the component orienter 16 has a central spanning member 136', identical to the spanning member of the lower section 66 of the tester unit, and mounted to the lower faces of the side rails 62 and 64 of the conveyor bed 12 by bolts 138' extending through an upper horizontal flange 140' at each end. A lower horizontal flange 142' on the spanning member 136' mounts an electrically controlled downwardly extending servo valve 144' for applying pneumatic pressure through lines 146' or 148' to either end of the air cylinder 141' to reciprocate the included piston (not shown). The air cylinder 141' is centrally mounted in the lower spanning member 136', coaxial with the clamping rod 232, beneath the central sections 84 of the conveyed components 6, with a threaded portion 150' of the cylinder 141' extending through a central hole in the flange 142' of the spanning member 136' and held in place by a nut 152' threaded onto the portion 150' tightly against the upper face of the lower flange 142'. A shock absorbing rubber washer 154' is threaded onto the upper end of the threaded portion 150' of the air cylinder 141'. A rotating and reciprocating shaft 238 extends from the upper end of the piston within the cylinder 141', through the threaded portion 150' and the shock absorbing washer 154'.

A "U" shaped lower mounting bracket 240 is fixed to the upper face of the lower flange 142' by bolts 242 extending through holes in a pair of horizontal feet 244 extending outwardly from the legs 248 of the "U" shaped lower bracket 240, through each of the transverse slots (not shown) in the flange 142'. A central spanning portion 246 of the lower mounting bracket 240 has a central circular aperture 249 having a flattened side for receiving a cylindrical boss 250, of a guide block 252, with a corresponding flattened side to prevent relative rotation. The guide block 252 is supported on the central spanning section 246 in a vertical position with the boss 250 extending therethrough and held in place by a nut 254 threaded on the outermost end of the cylindrical boss 250 adjacent the lower face of the spanning section 246. A reciprocating and rotating cylindrical cam 256 loosely nests in a coaxial circular passage 258 in the cylindrical guide block 252 and extends completely therethrough. The lower end of the cam 256 is secured to the upper end of the piston shaft 238 by a pair of roll pins 259 driven through coaxial passages in the shaft 238 and the cam 256 to prevent relative movement. A thrust pin 268 is slidably held in a radial cross passage 270 of the guide block 252 and extends from the surface of the block into the axial passage 258. The inner end of the thrust pin 268 lies in a cam slot configuration 260 (FIG. 11), formed in the surface of the cam 252, while the outer end of the thrust pin 268 extends out beyond the surface of the guide block 252 and is biased inwardly by a flat plate spring 271 secured to the face of the guide block 252, parallel to the axis thereof, by bolts 272 threaded into holes 274 in the surface.

Referring particularly to FIGS. 11 and 12, the cam slot configuration 260 comprises a pair of diametrically opposed vertical sections 262 continuously connected by a pair of "V" shaped sections, each composed of right hand and left hand legs 263 and 264 respectively. A lower vertical section 266 extends downward from each pair of merged legs of the "V". Each of the vertical slot sections 262 and 266 are of constant depth equal to that of the upper portion of the right hand leg 263. The slot depth of the leg 263 becomes shallower toward the bottom, there being a vertical drop off into the bottom of the lower vertical slot 266. The lower portion of the left hand "V" leg 264 is of equal depth with the lower vertical slot 266 while becoming shallower toward the upper end, there being a second vertical drop off 278 as the leg 264 merges into upper vertical slot portions 262.

A narrow cylindrical axial boss 280 extends from the upper end of the cam 256 into the bottom of a rectangular cradle block 282 and is held firmly in place by roll pin 284 extending through coaxial holes in the two members. The upper face of the cradle block is formed with a "V" shape 279 having the profile of the "V" extending across opposite faces 281, lying perpendicular to the side rails 62 and 64 when the block 282 is in the lower rest position as shown in FIGS. 9 and 10.

A pair of bifurcated plates 286 and 286' are mounted on the opposing sides 281 of the cradle block 282 by perpendicular flanges 288 fitting into a pair of grooves 290 in the perpendicular pair of opposing sides 292 of the cradle block 282 and held in place by bolts 294 threaded into the surface of the block through the flanges 288 and the sides 292. (In FIG. 10 the plate 288 is brokeen away to show the "V" profile cradle block 282 and the nesting portion of flange 288 in groove 290.) Plates 286 and 286' are each of rectangular shape with a central slot 296 extending vertically downward from the upper surface 298 to the upper shaped surface of the cradle 282. The upper edge of each slot 296 is beveled at 300 into the upper surface 298 so as to provide easier entry of the components 6.

In operation, the modular component orienter 16 acts on selected components 6 as directed by electrical impulses and initiated by the tester 14 and received by the servo 141'. When the tester 14 determines that a particular component 6 is reversed on the conveyor 4, with respect to some electrical test such as polarity, the orienter 16 is actuated as that particular component 6 stops momentarily above the cradle block 282. The air pressure from the servo valve 144' is released into line 148' connected with the bottom of the cylinder 141' beneath the included piston causing the piston to raise, the cradle 282 and fingers 286 and 286' to move up vertically around the component 6 with the leads 80 thereof fitting into the slots 296 while the component body 84 lies in the "V" shaped grooves 279 of the cradle block 282. The cradle 282 continues to rise until the component leads are completely outside of the article carrying slots 26 and the top of the component body 84 abuts the rubber bumper 231 biasing the bumper up slightly against the compression spring 234 to clamp the component securely. At this point the cradle 282 starts to rotate as it continues to move upward.

The motion of the cradle block 282 is controlled by the cam cylinder 256 which rises up without turning for the first portion of its path as the thrust pin 268 rides in the vertical portion 262 of the slot 260. As the pin 268 reaches the junction of the vertical portion 262 and the left and right hand "V" legs 263 and 264 respectively, the thrust pin 268 is forced into the right hand leg 263 due to the drop off 278 which prevents the pin from moving into the leg 264. During the next portion of its travel the pin moves relatively down the leg 263 rotating the rising cradle 90°. At the end of the leg 263 the pin drops off into the lower vertical slot 266 at which time the cradle 282 has reached the upper end of its travel. The servo valve then reverses, exhausting the air pressure from line 148' and applying the pressure through line 146' to move the piston down in the cylinder 141'. As the cradle 282 starts to descend the pin 218 is forced relatively up into the "V" slot portion 264 by the drop off 276. As the pin rides up the slot 264 the cradle rotates another 90° in the same direction, bringing the leads 84 of the component 6 again into alignment with the article carrying slots 26, although reversed 180° from the original position. During the remainder of the downward travel of the cradle it is restrained by the thrust pin 168 riding up in the second vertical slot 262 after passing the drop off 278.

*The modular component ejector*

Referring to FIGS. 13–16, the component ejector 18 is composed, in part, of an ejector chute unit, generally designated 302, mounted on the upper face of the side rail 62, a rejected component bin unit, generally designated 304, also mounted on the upper face of the side rail 62 and extending downwardly of the outer vertical face thereof and a lower ejector section, generally designated 306, secured on the lower faces of the side rails 62 and 64, beneath the component ejector unit 302. The low section 306 of the component rejector 18 has a central spanning member 136", identical to the spanning members 136 and 136' of the modular component tester and the modular component orienter respectively, and similarly mounted to the lower faces of the side rails 62 and 64 of the conveyor bed 12 by bolts 138" extending through an upper horizontal flange 140" at each end. A lower horizontal flange 142" on the spanning member 136" mounts a downwardly extending servo valve 144" for applying pneumatic pressure through lines 146" and 148" to either end of an air cylinder 141" to reciprocate the included piston (not shown). A "T" joint 308 (FIG. 14) is inserted between the servo valve 144" and the air line 148" with the cylinder 144" and the air line 148" connected across the head of the "T." The upwardly extending foot 310 of the "T" joint 308 rigidly mounts a hollow blow pipe 312 formed by a vertical section 314 and an upper horizontal section 316.

The air cylinder 141" is centrally mounted on the lower spanning member 136", beneath the center section of the conveyed components 6, with a threaded portion 150" of the cylinder 141" extending through a central hole in the flange 142" of the spanning member 136" and held in place by a nut 152" tightly threaded onto the portion 150" against the upper face of the lower flange 142". A shock absorbing rubber washer 154" is threaded onto the upper end of the threaded portion 150" of the air cylinder 141". A reciprocating shaft 238" fixed to the upper end of the included piston extends out of the upper end of the cylinder 141", through the threaded portion 150" and the shock absorbing washer 154".

A lower "U" shaped mounting bracket 240' is fixed to the upper face of the lower flange 142" by bolts 242' extending through holes in the horizontal feet 244' of the lower bracket and each of the transverse slots (not shown) in the flange 142". A central spanning portion 246' of the lower mounting bracket 240', between a pair of bracket legs 248' has a central circular aperture 249 (FIG. 15) with a flattened side (not shown) for receiving a cylindrical boss 250', of a guideblock 252', with a corresponding flattened side to prevent relative rotation. The guide block 252' is supported on the central spanning section 246' in a vertical position with the boss 250' extending therethrough and held in place by a nut 254' threaded on the outermost end of the cylindrical boss 250' adjacent the lower face of the spanning section 246'. A reciprocating cam 318 is slidably in a coaxial circular passage 258' in the cylindrical guide block 252' extending completely therethrough, the lower end of the cam 318 being secured to the upper end of the shaft 238' by a pair of roll pins 259, driven through coaxial passages. A roll pin 320 is press fitted into a radial cross passage 270' of the guide block 252' which extends from the surface of the block 252' to the axial passage 258'. The inner end of the roll pin 320 lies within the axial passage 258' and in a vertical slot 322 formed in the surface of the cam 318 and extending its entire length to prevent rotation of the cam while permitting reciprocation.

A component lifter 324 is secured to the upper face 326 of the cam 318 by a bolt 328 extending through the base plate 330 of the lifter 324 and into an axial threaded hole 332 in the cam 318. The component lifter 324 has a pair of opposed vertical lifting plates 334 extending upwardly from the transverse ends of the base plate 330 beneath the leads 80 of the conveyed component 6 on either side of the component body 84. The upper end of each plate has a "V" shaped slot 335 formed therein, the apex of the "V" lying directly under the axis of the leads 80 of the components 6, as the component stops momentarily within the ejector 18.

The ejector guide 302 is a plastic hollow cylinder 336 with a plastic mounting block 338 cemented to the underneath side and at the outer end thereof for mounting the ejector guide to the upper face of the side rail 62 by bolts 340 extending through holes 339 in the mounting block 338 on either side of the cylinder 336. A slot 342, in the hollow cylinder cuts the entire lower half of the cylinder 336 and at one side thereof meets a second slot 344 extending along one side from the inner end of the mounted cylinder parallel to the cylindrical axis. The portion 346, delineated by the slots 342 and 344 is bent inwardly to form an approximate helix blending into the circular surface of the cylinder 336. The open area between the end of the helix and the adjacent outer wall of the cylinder 336 (FIG. 14) lies directly above the lifter plates 334. The axis of the horizontal portion 316 of the hollow blow pipe 312 lies parallel to the axis of the plastic cylinder 336 and extends into the segment of the cylinder 336 defined in point by the helix wall 346 and the continuous portion of the cylinder wall 336.

The rejected component bin unit 304 is composed of a bin holding framework generally designated 350 having a mounting flange 352 clamped between the upper face of the side rail 62 and the mounting block 338 of the ejector guide 302. A vertical wall 353 of the frame work 352 is connected, at its upper end, to the mounting flange 352 and at its lower end to a horizontal, outwardly extending floor 354. Strengthening side braces 356 extend diagonally from the uper end of the vertical wall 358 to the outer end of the floor 354 and therewith define the framework 350 for holding the removable bin 356 adjacent and below the outer end of the ejector guide 302.

In operation, the modular component ejector 18 acts on selected components as directed by electrical impulses received by the servo valve 141″ and initiated by the tester 14. When the tester 14 determines that a particular component 6 does not test out satisfactorily due to a short circuit, because it is outside the electrical tolerance limits imposed, etc., the ejector 18 is actuated as that particular component 6 stops momentarily above the lifter 324. The air pressure, from the servo valve 144″ is released through the "T" joint 308 into the blow pipe 302 and through the air line 148″ into the bottom of the cylinder 141″ beneath the included piston. As the piston rises quickly upward the lifting plates 334 catch the component 6 in the "V" shaped grooves and drive it upward out of the article carrying slots 26 in the conveyor belts 20 as the conveyor is momentarily halted.

The lifting plates 334 rise into the area between the walls 336 and 346 of the ejector chute 302 very rapidly where they come to a halt as the piston reaches the top of the cylinder 141″. After a momentary pause the servo valve 144″ reverses, shutting off the air to the blow tube 312 by exhausting line 148″ and applying pressure now to line 146″ to return the piston to its rest position. The momentum of the component 6 carries it upward out of the lifting plates 334 at the top of the piston stroke and against the inner wall of the cylinder 336 which it follows until it drops into the interior of the helix before the servo valve reverses the air pressure, the air blast from the blow tube 312 driving the component 6 along the guide cylinder's length until it falls out into the bin 356 set in the framework 350 to accept any rejected components 6.

Although we have described a preferred method of ejection it is within the scope of this invention to use the lifting means in conjunction with other types of horizontal displacement devices such as a tilted chute used without a blow pipe and air jet or an air jet used without a chute which propels a component directly into a rejected component bin. Further the guide cylinder may be modified to pass the components directly to a rejected component bin mounted over the conveyor assembly and beneath the helical portion of the guide cylinder.

*Sequence operation*

Referring particularly to the schematic diagram of FIG. 17, a master sequencer and programmer 358 controls an inline testing and handling system incorporating the instant invention by emitting four simultaneous signals for each station in the system including (1) a "line command index" signal for moving the conveyor belts 20 a distance equal to the space between adjacent article carrying slots 26, (2) a "test conditions" signal for actuating a series of stimuli emitters 360, (3) a "test limits" signal for exciting a series of test limits devices 362, and (4) a "test enable" signal functioning through a time delay 364 for actuating a series of comparators 366. The comparators 366 each receive the "test limits" signal from one of the test limits devices 362 and a "response" signal from one of the components 6 acted on by a stimuli emitter 360. The resulting comparison signals are sent to a multiple uniregister 368 for storing the information when the comparators 366 receive the "test enable" signal. The uniregister 368 later dispensing it to an orienter 370 and a decorder 372. The orienter 370 reverses selected components during an indexed stop at the orientation station while the decorder 372 sends a signal in turn to one of a group of ejector units 374 making up a category sorter. Each component is acted on by one of the ejector units 374 to place it in a particular bin. In this way a group of components may be tested and categorized quickly and inexpensively.

It can be seen from the previous descriptions that the tester, orienter and ejector units have many parts in common. All three use the same lower spanning members, servo valve units, and piston and cylinder combinations, the orienter and the tester furthermore use the same upper spanning member and main bracket. This allows an economy in upkeep wherein used or broken units can be dismantled and the parts thereof substituted in other malfunctioning units and furthermore permits a lower initial cost due to larger production runs on the individual elements. The bolt-on features of all of the units allows for any number of tests to be arranged consecutively or interposed in any particular relationship between orienting or ejecting stations depending on requirements, resulting in a smaller number of machines being required by a manufacturer and a lower cost for small batch runs of components.

The extremely fast action of the basic unit permits it to be used in high speed production lines such as taping assemblies. As an example, the testing units already built have been found to have reaction times from, the command to seated contact, of less than 100 milliseconds. The orienter unit has a time of 500 milliseconds from, the command to reorientation, and the ejector unit has a time of 250 milliseconds from, command to ejection. The system requires 115 v. A.C., 60 cycles, and lubricated dry air at 40 p.s.i.

Each testing, orienting or ejecting unit can be automatically controlled as disclosed above or can be manually controlled by a pushbutton in conjunction with sight inspection. The individual test units are adaptable to on-tape testing as well as in line testing. The orienter unit may be used to reorient such polarized components as diodes, tantalum capacitors and aluminum electrolytic capacitors, and non-polarized components such as Mylar film capacitors and paper capacitors while the ejector unit may be used for reject or category binning.

Since many other embodiments of this invention may occur to those skilled in the art, it is to be understood that the embodiments of the present invention as shown and described are only illustrative of many possible embodiments and are not intended as a limitation of the scope of the invention.

What is claimed is:

1. An in-line processing machine for elongated components comprising: a conveyor assembly including spaced article carrying means so positioned that the ends of the elongated components normally are retained thereon and at least one processing station adjacent said conveyor, said processing station including support means adapted to contact said component adjacent the ends thereof between said article carrying means and vertically reciprocating means for lifting said support means to remove said component from said article carrying means for processing and lowering said support means to position said component back onto said article carrying means after processing.

2. An in-line processing machine according to claim 1 wherein said processing station also includes means for incrementally rotating said support means each time said support means is lifted, whereby said component is removed from said article carrying means and replaced back onto said article carrying means in a rotated position.

3. An in-line processing machine according to claim 1 in which said article carrying means are provided with spaced pairs of opposing article carrying slots, said reciprocating means being actuated in timed relation to the movement of said conveyor whereby said support means is lifted to remove said component from said opposing article carrying slots to position said component for a processing step thereon when said component lies directly above said support means.

4. An in-line processing machine according to claim 3 wherein said processing station includes a lower spanning section extending transversely across and disposed beneath said conveyor, said lower spanning section being adapted to carry said support means and said vertically reciprocating means, and an upper spanning section extending transversely across said conveyor and mounted directly above transversely across said conveyor and mounted directly above said conveyor and said lower section, and means carried on said upper section adapted to coact with said support means on said lower section to process said components.

5. An in-line processing machine according to claim 4 in which said vertically reciprocating means of each processing station is pneumatically actuated and the pneumatic actuator is controlled by an electrical signalling means.

6. An in-line processing machine according to claim 1 wherein said elongated components are axial lead electrical components, each component having a central body portion and a pair of coaxial leads extending from either end thereof.

7. An in-line processing machine according to claim 6 in which said article carrying means includes a pair of parallel vertical planar flanges with at least one substantially vertical article carrying slot in each flange, a plane through the opposing pair of slots in the parallel belts being approximately perpendicular to the flanges, said component body portion residing between the flanges and the leads being supported in the article carrying slots in said flanges.

8. An in-line processing machine according to claim 7 wherein an endless belt is carried one on each said flange and disposed perpendicular thereto, and means are provided to drive said belts simultaneously whereby said plane through the pair of opposing article carrying slots is retained perpendicular to planes through each flange at all times.

9. An in-line processing machine according to claim 6 wherein the processing station support means comprises in part a pair of spaced elements having slots adapted to removably receive the component leads on both sides of said component body when said support means is lifted.

10. An in-line processing machine according to claim 1 in which there are at least two processing stations, a first processing station for electrically testing said each components as each component passes through the first processing station and a second processing station, means for controlling the second processing station from said test station for further processing said components as the component is conveyed through the second processing station.

11. An in-line processing machine according to claim 1 in which there are at least three processing stations, a first processing station for electrically testing said each components as each component passes through the first processing station, a second processing station and a third processing station means for controlling the second and third processing station from the testing station.

12. An in-line processing machine according to claim 10 in which at least one of the controlled processing stations is a component orienter station.

13. An in-line processing machine according to claim 10 in which at least one of the controlled processing stations is a component ejector station.

14. An in-line processing machine according to claim 11 in which one of the testing station controlled processing stations is a component orienting station and the other testing station controlled processing stations is a component ejecting station.

15. An in-line processing machine according to claim 1 wherein said processing station includes a lower section disposed beneath said conveyor, said lower section being adapted to carry said support means and said vertically reciprocating means, and an upper section disposed directly above said conveyor and said lower section, means carried on said upper section for clamping said component to said support means during processing, and means associated with said support means to effect rotation thereof, whereby said component is removed from said article carrying means, rotated 180°, and positioned back onto said article carrying means.

16. An in-line processing machine according to claim 15 in which said component includes a body portion and a pair of leads extending from the ends thereof, and said support means includes a central cradle block having a groove extending across the face thereof for supporting said body portion of the component and a bifurcated plate mounted adjacent each end of said groove for supporting said leads of said component, and said support means rotating means includes a cylindrical block fixed to said cradle block, said cylindrical block having a cam slot configuration on its face, and a cam slot follower mounted on said lower section adjacent to said cylindrical block for causing said block to be rotated when said support means is lifted.

17. An in-line processing machine according to claim 15 in which said clamping means is yieldably mounted beneath said upper section and is rotatable with said support means during processing of said component.

18. An in-line processing machine according to claim 1 in which there are at least two processing stations, a first processing station for electrically testing each said component as each said component passes through said processing station, said first processing station being said one processing station, and a second processing station, means for controlling said second processing station from said first processing station, and said second processing station includes a hollow chute having inner and outer end sections, said outer end section being mounted above and at one side of said conveyor, means mounted beneath said conveyor and disposed between said article carrying means for vertically propelling a component upwardly from said article carrying means and into said hollow chute, and component ejector means for propelling vertically driven components through said hollow chute from said inner to said outer ends thereof.

19. An in-line processing machine according to claim 18, wherein said chute is generally cylindrical in cross-sectional design having the axis thereof disposed parallel to and transversely of said article conveying means, said chute being cut along axially and circumferentially extending lines to define a flap disposed above components positioned on said article carrying means, said flap being curved inwardly to provide an opening in the periphery of said chute into which vertically propelled components may be received.

20. An in-line processing machine according to claim 19 in which said flap forms a trough disposed parallel to the axis of said cylinder, said trough acting to receive components propelled into said chute through said opening, and said ejector means includes a fluid jet directed into and generally axially of said trough to propel components from the inner to the outer ends of said chute.

21. A modular axial lead component testing device for spanning a conveyor carrying a series of axial lead components, each component having a cylindrical central body portion and a pair of axial leads extending from both ends thereof, each component suspended in article carrying means in the conveyor by its pair of axial leads, comprising; an upper spanning section transversely spanning the conveyor above said conveyed components, a lower spanning section transversely spanning the conveyor beneath the conveyed components, lifting and supporting means vertically reciprocatable in said lower spanning section for lifting said axial lead components out of the conveyor article carrying means, the lifting and supporting means composed, in part, of a first pair of electrical contacts, at least one upper contact assembly, mounted on the upper spanning section and composed in part of a second pair of electrical contacts mounted directly above the first electrical contacts, each of said contacts of said first and said second pairs of electrical contacts being in electrical contact with the opposing axial leads of an axial lead component when the lifting and supporting means is in its uppermost position and said component and said first and second contacts are electrically isolated from the article carrying means whereby the component is adapted to be electrically tested.

22. A modular axial lead component testing device according to claim 21 wherein the lifting and supporting means comprises, in part, a pair of insulated supporting means, each supporting means having a "V" shaped supporting face and a central aperture in juxtaposition with the apex of the "V," one of said first contacts being fixed within the central aperture of each "V" shaped face and extending up into the apex of the "V" whereby the components leads are held in the "V's" abutting the upper ends of the first electrical contacts.

23. A modular axial lead component testing device according to claim 22, wherein said conveyor has a pair of spaced article carrying means and said supporting and lifting means is vertically extended up between said pair of spaced article carrying means to lift the component to be tested above the conveyor.

24. A modular in-line tester for testing components disposed on a component carrying means comprising: a lifting means adapted to lift a component off said carrying means and place said component in a test position, said lifting means including a component support means and means to vertically reciprocate said component support means, and a clamping means arranged substantially above said lifting means and adapted to hold the component in a test position between said support means and said clamping means, a test contact means associated with said lifting and clamping means whereby electrical impulses may be passed through said component.

25. A modular in-line tester according to claim 24 wherein the carrying means comprises a conveyor having a pair of endless parallel belts, said belts being laterally spaced apart and having spaced pairs of opposing slots adapted to support the ends of said components.

26. A modular in-line tester according to claim 25 wherein said support means comprises, in part, a pair of electrical contacts connected in a test circuit and arranged to make electrical contact with the component leads.

27. A modular in-line testing station for testing axial lead components carried therethrough on a conveyor means comprising an upper spanning section above the conveyed components and a lower spanning section below the conveyed components, a first pair of spaced electrical contacts spring mounted in one of the spanning sections, means to adjust the spacing between said first electrical contacts, a second pair of electrical contacts mounted on the other spanning section, means in conjunction with said second electrical contacts for supporting an axial lead component by both axial leads thereof and means for vertically reciprocating said supporting means with said second electrical contacts simultaneously through the center of said conveyor to bias the first contacts against the said spring mountings and means for adjusting the spacings between the second pair of electrical contacts whereby a component may be removed from the conveyor and tested as the conveyor halts with a component within the tester station.

28. A modular in-line tester station according to claim 27 wherein said second electrical contacts are mounted on the lower spanning section, each of the second electrical contacts being mounted within a first insulated contact holder, and said means for supporting an axial lead component by both leads thereof comprises a V-shaped groove in the upper end of each of the insulated contact holders, a portion of the electrical contact within each of said insulated contact holders extending into the lower end of the V-shaped groove therein whereby the leads, of a component when being tested, are held in position by the grooves in the contact holders and are in electrical contact with the contacts extending into the lower ends of said grooves.

29. A modular in-line testing station according to claim 28 wherein said first electrical contacts are each mounted within a second insulated contact holder and extend outwardly from a face thereof, said second contact holders being each vertically yieldable in an upper contact assembly mounted on the upper spanning section.

References Cited by the Examiner

UNITED STATES PATENTS

| | | | |
|---|---|---|---|
| 2,134,832 | 11/1938 | Morrison | 198—131 |
| 2,405,805 | 8/1946 | Albertoli | 198—20 |
| 2,652,139 | 9/1953 | Baehr | 198—33 |
| 2,734,628 | 2/1956 | Schlayer | 209—81 X |
| 3,009,109 | 11/1961 | Jankowski | 209—81 X |
| 3,027,989 | 4/1962 | Phillips | 198—20 |
| 3,032,191 | 5/1962 | Clukey | 209—75 |
| 3,058,064 | 10/1962 | Thomas | 324—158 |
| 3,073,446 | 1/1963 | Wilson | 209—81 |
| 3,084,326 | 4/1963 | Mitchell | 324—158 |
| 3,115,234 | 12/1963 | Eleftherion | 198—33 |
| 3,138,239 | 6/1964 | Ackerman | 198—131 |
| 3,140,773 | 7/1964 | Cheh | 198—131 |
| 3,144,938 | 8/1964 | Wahl | 209—81 |

M. HENSON, WOOD, JR., *Primary Examiner.*

ROBERT B. REEVES, *Examiner.*

J. E. OLDS, J. N. ERLICH, *Assistant Examiners.*